(12) United States Patent
Drew (10) Patent No.: US 10,858,055 B2
(45) Date of Patent: Dec. 8, 2020

(54) ADJUSTABLE BICYCLE STAND

(71) Applicant: Delta Cycle Corporation, Randolph, MA (US)

(72) Inventor: Errol Drew, Los Gatos, CA (US)

(73) Assignee: Delta Cycle Corporation, Randolph, MA (US)

( * ) Notice: Subject to any disclaimer, the term of this patent is extended or adjusted under 35 U.S.C. 154(b) by 0 days.

(21) Appl. No.: 16/524,480

(22) Filed: Jul. 29, 2019

(65) Prior Publication Data

US 2020/0047833 A1 Feb. 13, 2020

Related U.S. Application Data

(60) Provisional application No. 62/715,356, filed on Aug. 7, 2018.

(51) Int. Cl.
| | | |
|---|---|---|
| *B21H 3/04* | (2006.01) | |
| *B62H 3/04* | (2006.01) | |
| *B62K 3/14* | (2006.01) | |

(52) U.S. Cl.
CPC ............... *B62H 3/04* (2013.01); *B62K 3/14* (2013.01)

(58) Field of Classification Search
CPC ... B62H 3/04; B62H 3/06; B62H 3/08; B62H 3/10; B62H 5/005; A47J 47/16; A47B 77/14; A47B 81/04; B62K 3/14
See application file for complete search history.

(56) References Cited

U.S. PATENT DOCUMENTS

| | | | | |
|---|---|---|---|---|
| 386,674 A | * | 7/1888 | Wells ...................... | B42F 17/08 211/11 |
| 2,062,802 A | * | 12/1936 | Walker ..................... | A47F 7/175 211/44 |
| 2,160,050 A | * | 5/1939 | Wolf ......................... | A47F 7/22 211/85.3 |
| 3,260,429 A | * | 7/1966 | Yuda ......................... | B60R 9/10 224/324 |
| 3,465,892 A | * | 9/1969 | Taylor ...................... | A47J 47/16 211/41.11 |
| 3,603,459 A | | 9/1971 | Erb | |
| 3,785,500 A | * | 1/1974 | Kennelly .................. | B62H 3/04 211/5 |
| 3,901,421 A | * | 8/1975 | Kalicki ..................... | B60R 9/10 224/310 |
| 4,592,471 A | * | 6/1986 | Bross ........................ | A47J 47/16 108/61 |
| 5,064,236 A | * | 11/1991 | Stanfield .................. | A47J 47/16 211/49.1 |
| 5,833,074 A | * | 11/1998 | Phillips ..................... | B60R 9/10 211/21 |
| 6,116,436 A | * | 9/2000 | Ferrucci .................. | A47B 55/02 108/181 |
| 6,237,878 B1 | * | 5/2001 | Nelson .................... | B65B 67/1227 248/97 |

(Continued)

*Primary Examiner* — Ko H Chan
(74) *Attorney, Agent, or Firm* — Iandiorio Teska & Coleman, LLP (57) ABSTRACT

An adjustable bicycle stand includes a pair of forward and rearward base members and a pair of right and left upright members supporting a bicycle wheel therebetween. Each upright member extends between both the forward and rearward base members. At least one of the upright members is adjustable relative to the forward and rearward base members.

19 Claims, 13 Drawing Sheets

(56) References Cited

U.S. PATENT DOCUMENTS

| | | | | |
|---|---|---|---|---|
| 6,868,976 B1* | 3/2005 | Lassanske | ................ | B62H 3/08 |
| | | | | 211/21 |
| 9,730,553 B2* | 8/2017 | Bombard | ............ | A47J 37/0694 |
| 10,065,568 B2* | 9/2018 | Phillips | .................... | B60R 9/06 |
| 2004/0251219 A1* | 12/2004 | Zimmerman | ............ | B62H 3/06 |
| | | | | 211/17 |
| 2019/0159632 A1* | 5/2019 | Stevens | .................. | A47J 47/16 |

\* cited by examiner

ADJUSTABLE BICYCLE STAND

RELATED APPLICATIONS

This application claims benefit of and priority to U.S. Provisional Application Ser. No. 62/715,356 filed Aug. 7, 2018, under 35 U.S.C. §§ 119, 120, 363, 365, and 37 C.F.R. § 1.55 and § 1.78, which is incorporated herein by this reference.

FIELD OF THE INVENTION

This subject invention relates to bicycle stands.

BACKGROUND OF THE INVENTION

Adjustable bicycle stands enable support of different bicycle width tires, for example, narrow street or road bike tires, wider mountain bike tires, and even still wider fat tire bike tires. See U.S. Pat. No. 3,603,459 and the Delta Cycle Manet Single Bike Floor Stand both incorporated herein by this reference.

BRIEF SUMMARY OF THE INVENTION

Still, there is a need for smaller, less expensive, easier to use and easier to manufacture adjustable bicycle stands. Featured, in one specific embodiment, is an adjustable bicycle stand which is compact, easy to assemble, portable, lightweight, and easy to adjust.

Featured is an adjustable bicycle stand comprising a pair of forward and rearward base members and a pair of right and left upright members supporting a bicycle wheel therebetween. Each upright member extends between both the forward and rearward base members. At least one of the upright members is adjustable relative to the forward and rearward base members.

The adjustable bicycle stand may further include a pair of support members for each upright member, a forward support member extending between the forward base member and the upright member and a rearward support member extending between the rearward base member and the upright member. The base members may each include a series of spaced slots therein and each support member is engagable into a said slot. In one preferred design, the base members each include a top channel including said slots and each upright member includes a pair of spaced depending sections inserted into said channels and tabs inserted into said slots. Each support member may include an angled member extending between an upright member to a base member. In one design, each upright member includes a pair of spaced channels receiving an end of a said angled support member therein. Also, each angled support member may include a depending tang received in a slot of a base member.

The adjustable bicycle stand base members may include opposing angled ends and each upright member may be in the form of a frame.

Also featured is an adjustable bicycle stand comprising a pair of forward and rearward base members, a pair of right and left upright members supporting a bicycle wheel therebetween, each upright member extending between both forward and rearward base members, and a pair of support members for each upright member, a forward support member extending between the forward base member and the upright member and a rearward support member extending between the rearward base member and the upright member. The support members and upright members are adjustable relative to the base member.

Also featured is a method of adjusting a bicycle stand. One preferred method includes engaging a first upright member to spaced forward and rearward base members, securing a support member between the forward base member and the first upright member, securing a support member between the rearward base member and the first upright member, spacing a second upright member from the first upright member and engaging the second upright member to the spaced forward and rearward base members, securing a support member between the forward base member and the second upright member, and securing a support member between the rearward base member and the second upright member.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
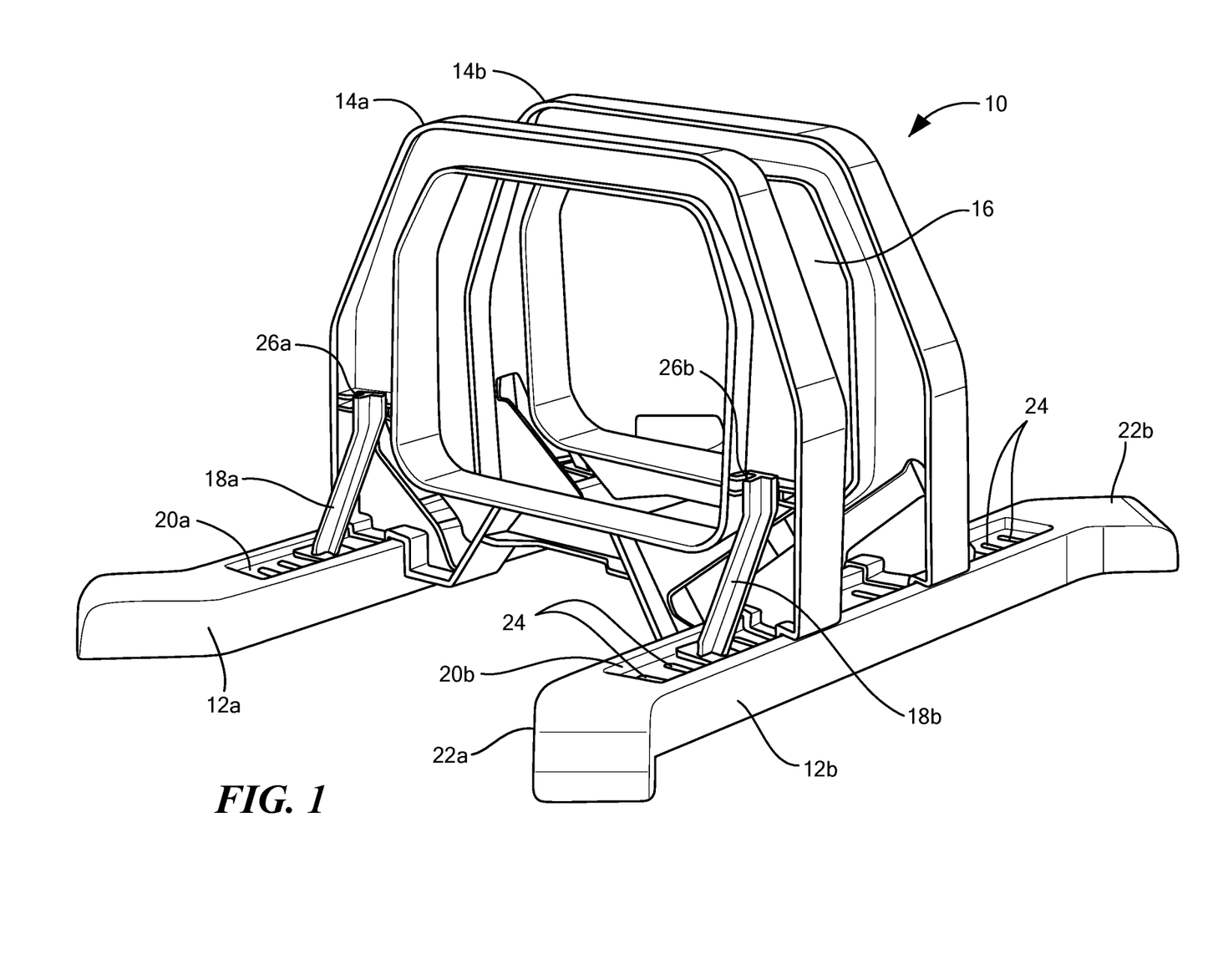
FIG. 1 is schematic three dimensional view of an example of an adjustable bicycle stand in accordance with the invention.

In the example of FIG. 1, compact bicycle stand 10 includes forward 12a and rearward 12b base members and left 14a and right 14b upright members. Each upright member extends between and is supported by both forward 12a and rearward 12b base members. The bicycle wheel is supported in the space 16 between the left 14a and right 14b upright members. And, this space 16 is adjustable to accommodate bicycle tires of different widths.

Figure 4:
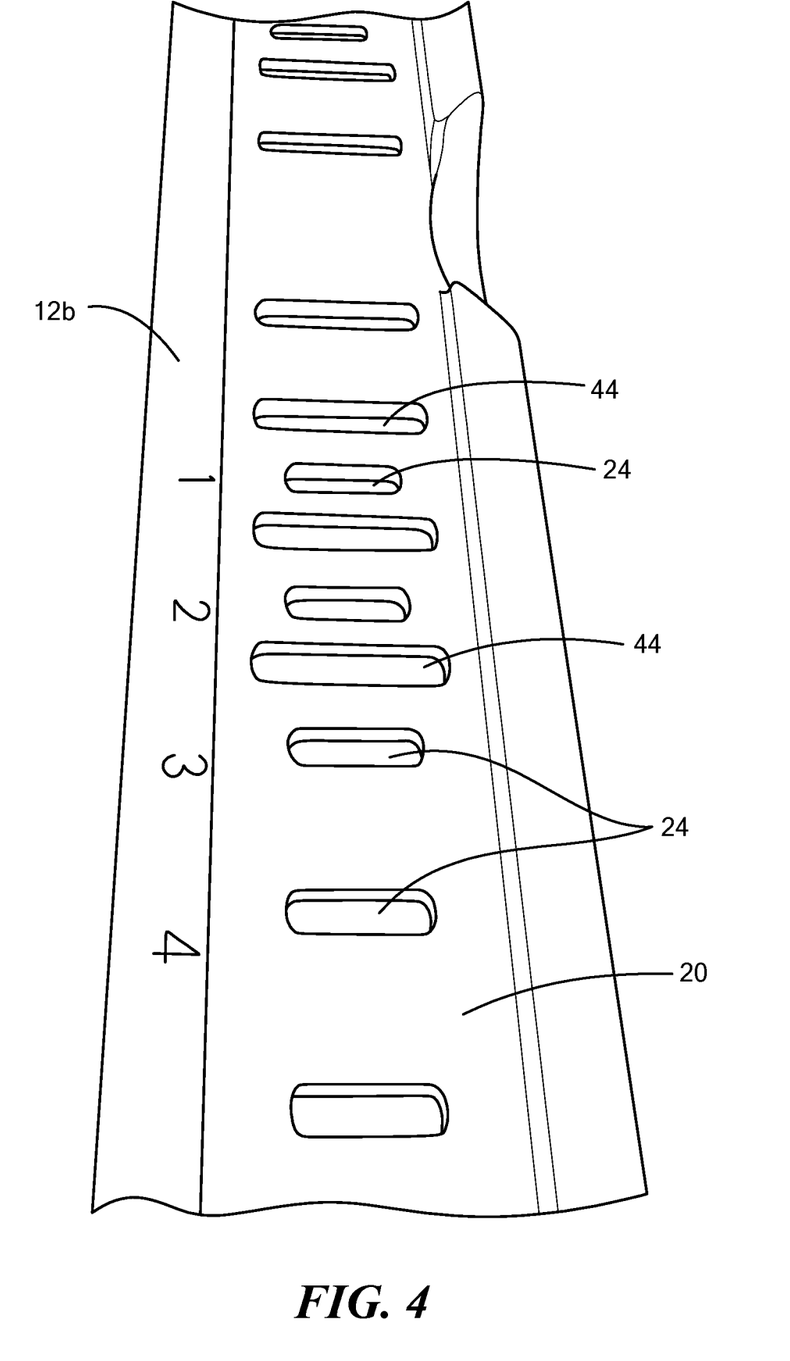
FIG. 4 is a another view of the base member of FIG. 3 showing a channel therealong with various slots for both the upright members and the support members.
Figure 11:
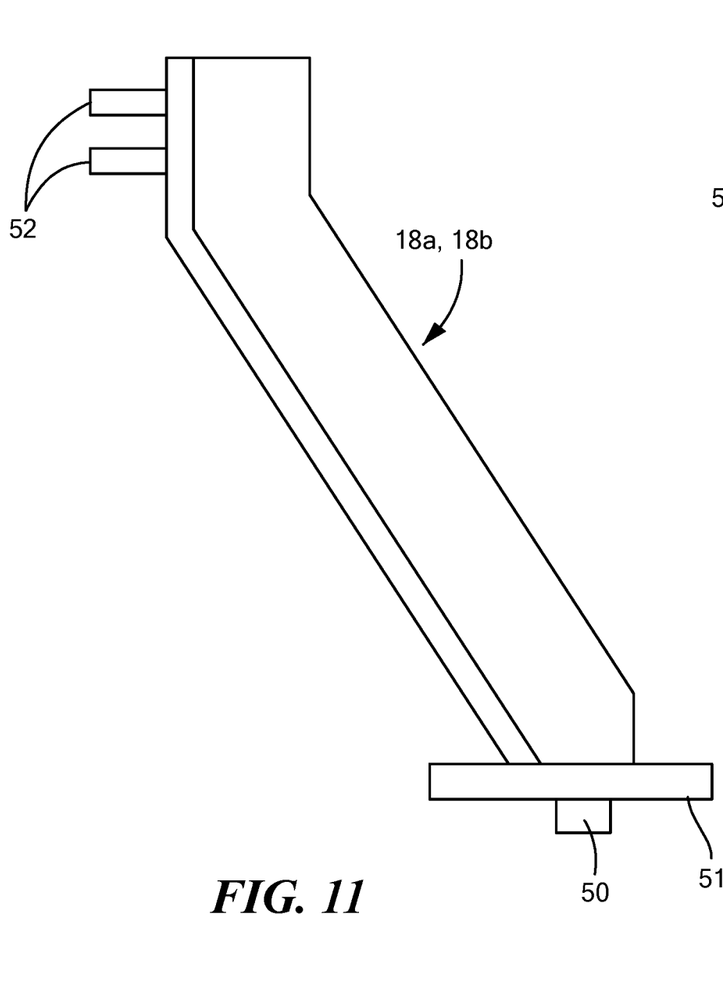
FIG. 11 is a schematic view showing the upper inside portion of a support member configured to engage an upright member.
Figure 12:
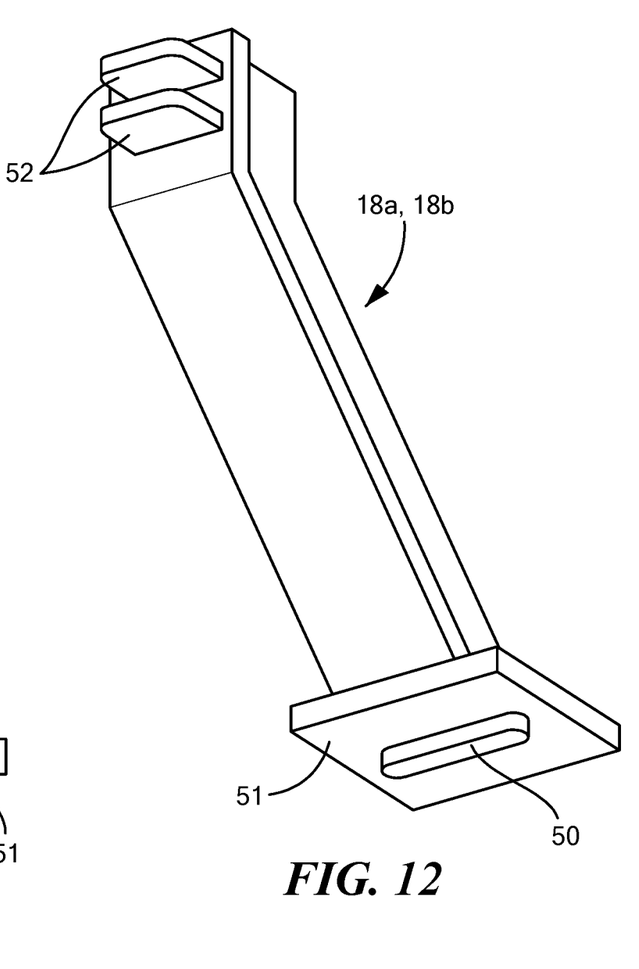
FIG. 12 is a schematic view showing the bottom of a support member.

In this particular design, there are two angled outer supports for each upright member. For example, as shown for upright member 14a, angled support 18a extends at an angle between forward base member 12a and left upright member 14a and angled support 18b extends at an angle between rearward base member 12b and left upright member 14a. A similar pair of supports support right upright member 14b with respect to front base member 12a and rear base member 12b. Each angled member 18, FIGS. 8-13 may include a bottom tang 50 received in one of the shorter slots 24, FIG. 4 of the base members and a pair of upper crosswise tangs 52, FIG. 11 fitting into cross channel 26b of the upright member, FIG. 8. Angled member bottom tang 50, FIG. 12 is underneath broader footing 51 received in the base member channel 20.

Figure 3:
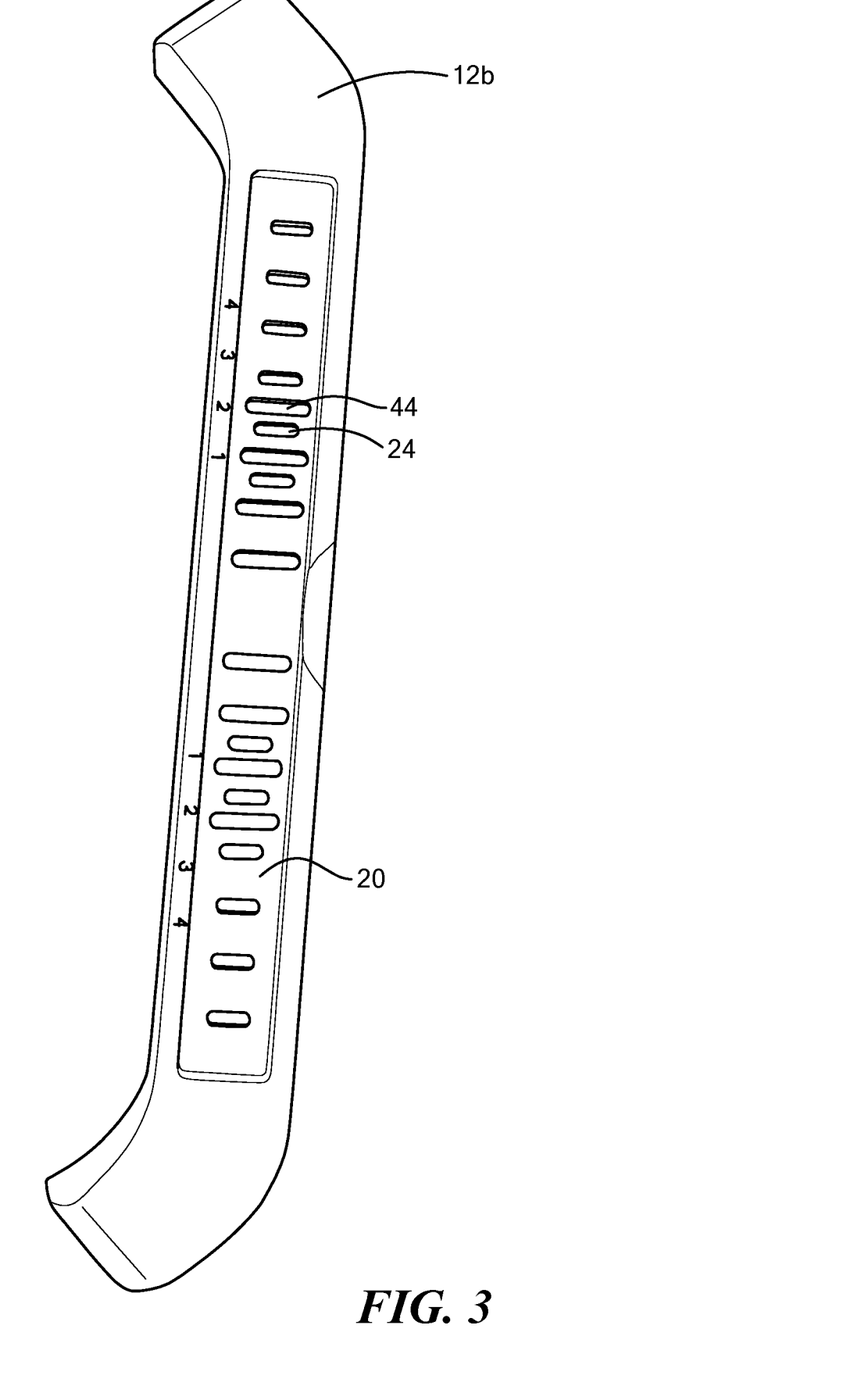
FIG. 3 is a schematic view showing an exemplary base member.
Figure 8:
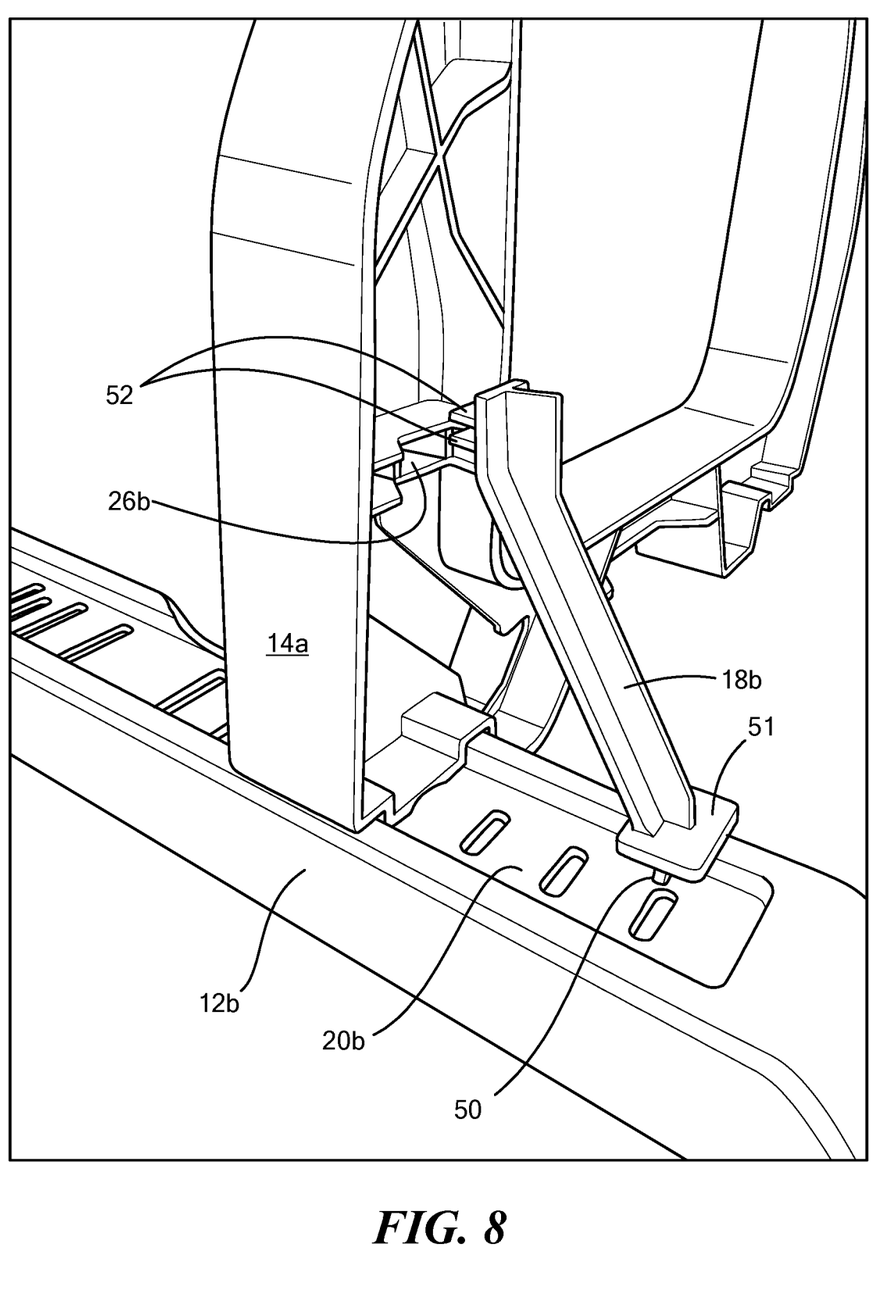
FIG. 8 is a schematic view showing an angled member being secured between an upright member and a base member.
Figure 9:
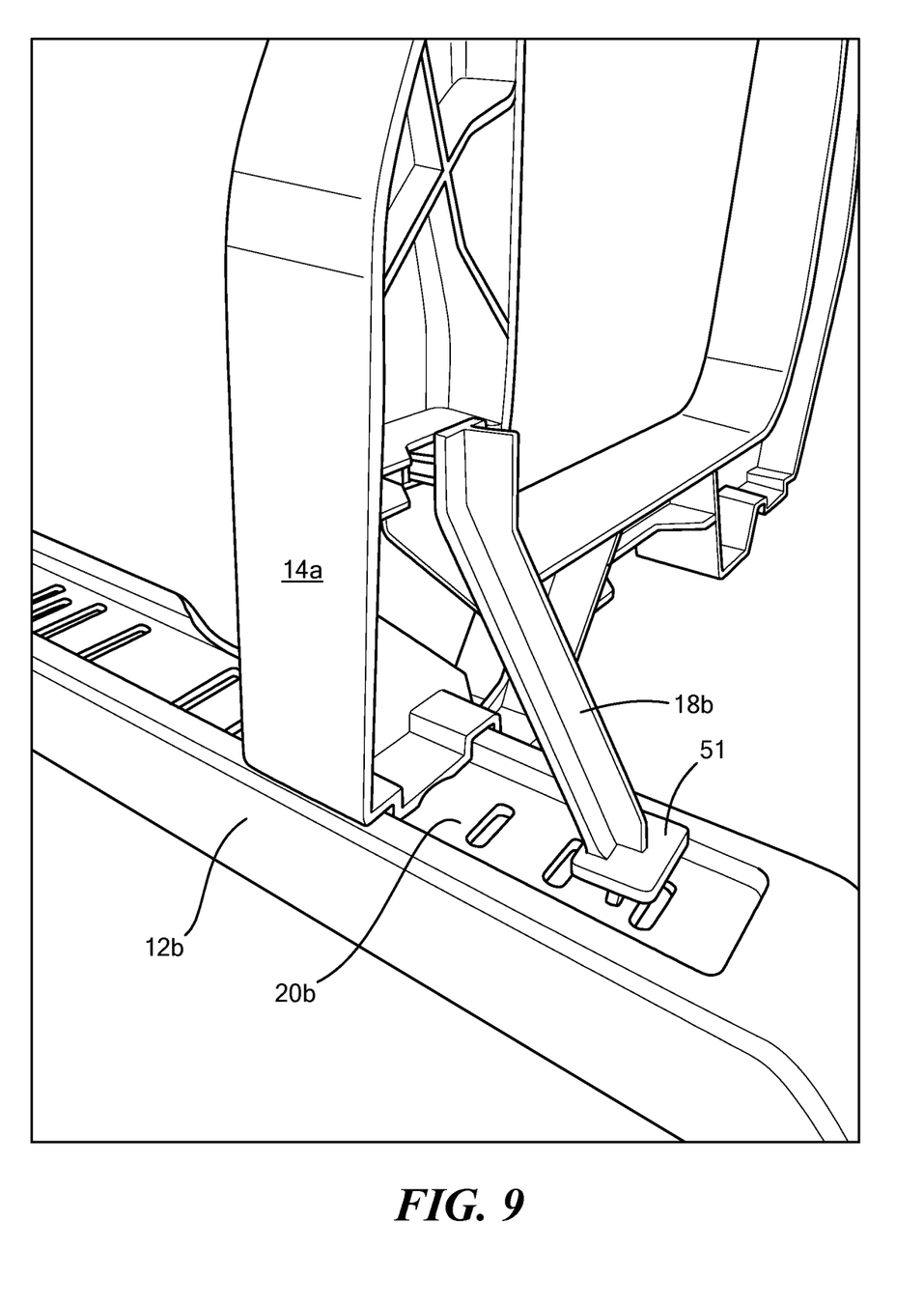
FIG. 9 is a another schematic view showing a support member being secured between an upright member and a base member.
Figure 10:
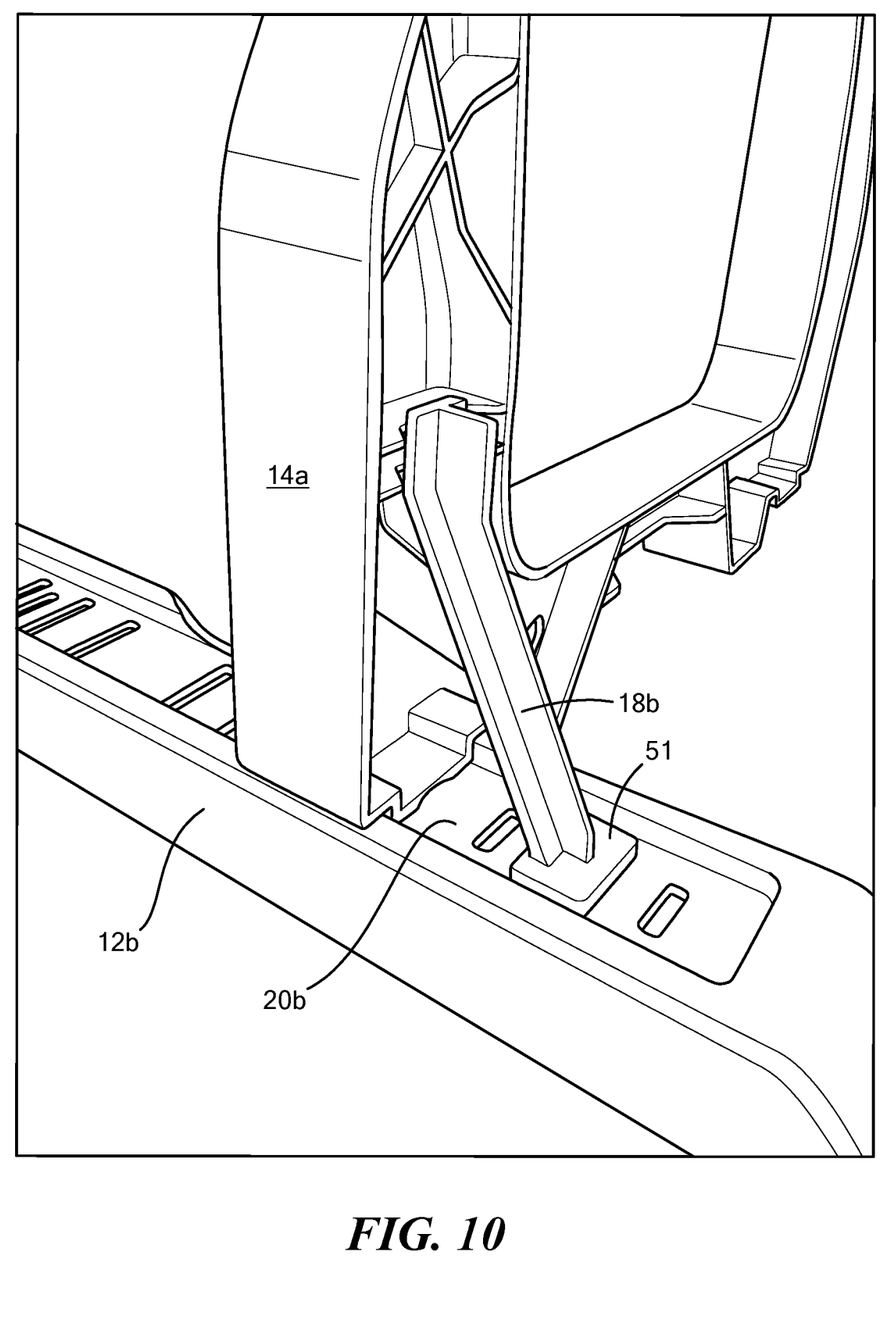
FIG. 10 is still another schematic view showing a support member positioned to support an upright member relative to a base member.

Preferably, each base member 12a, 12b includes a top channel 20a, 20b, respectively, extending therealong between angled ends 22a, 22b as shown for rear base member 12b. Spaced slots 24 and 44 as shown for base member 12b, FIG. 3 reside in channel 20b. In this way, each angled member support 18a, 18b extends from a shorter slot 24 in the base member and into a cross channel 26a, 26b in the outside of each upright member 14a as shown in FIG. 8-10.

Figure 5:
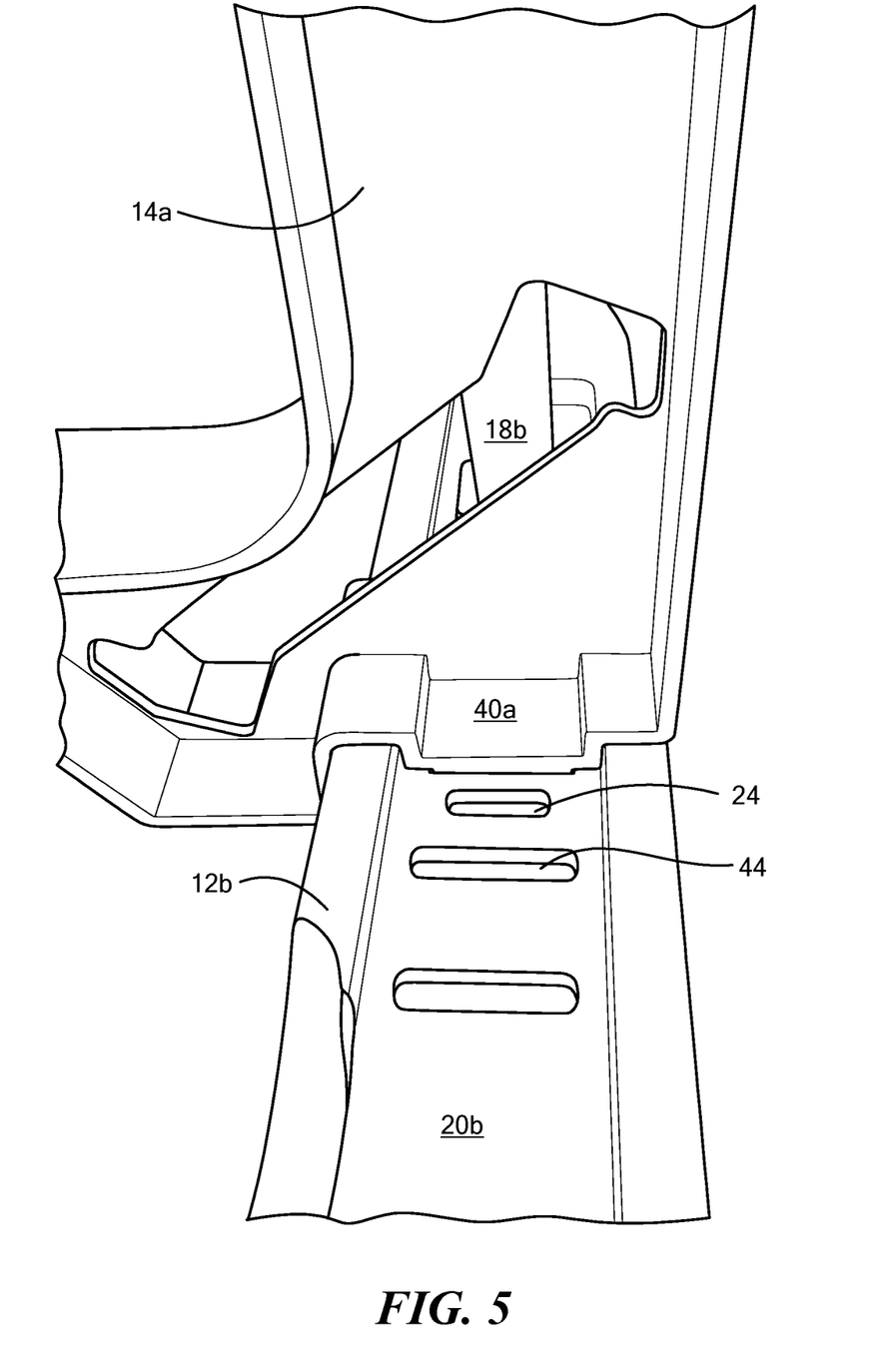
FIG. 5 is a schematic view an upright member releasably coupled to a base member.
Figure 6:
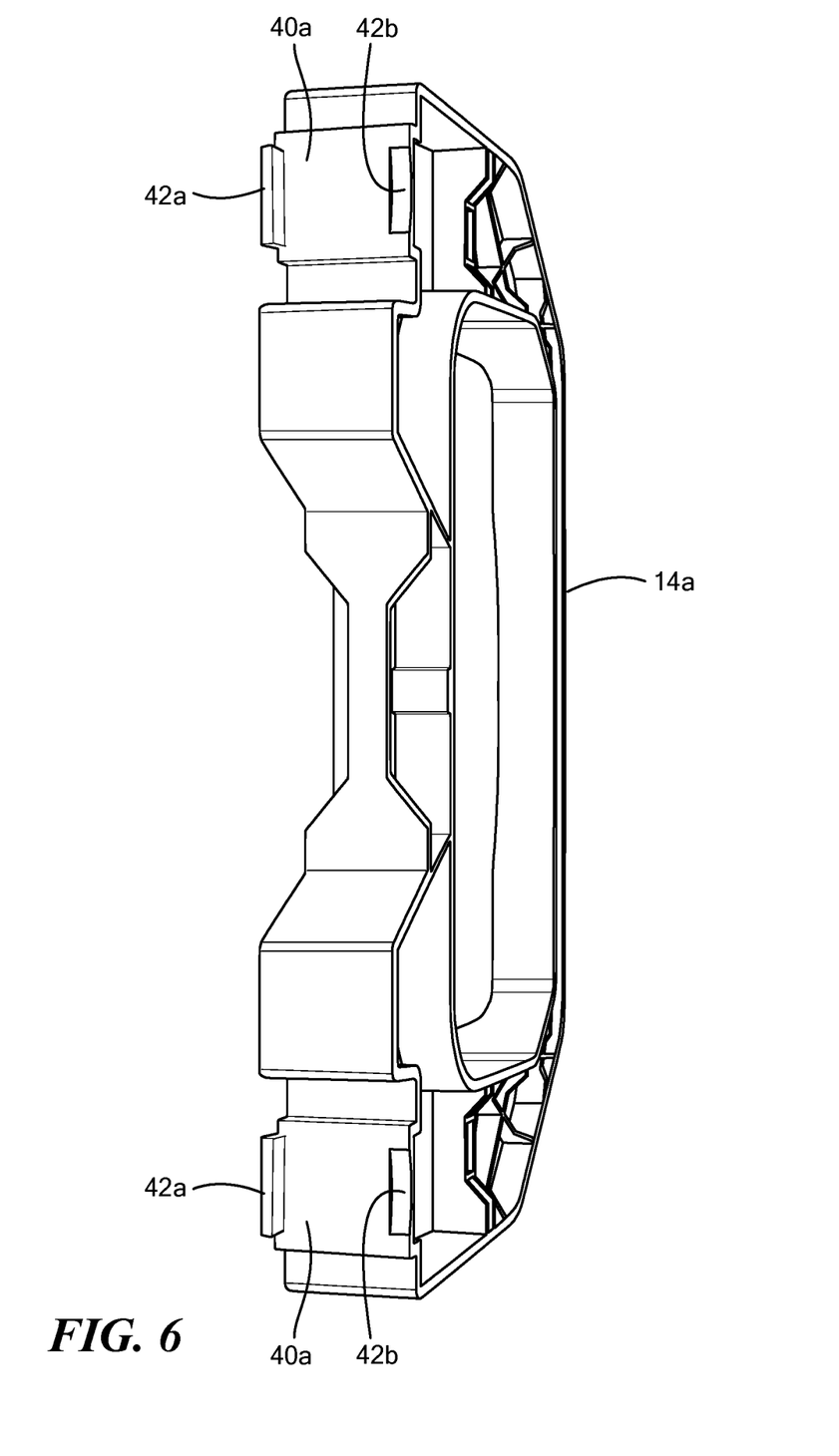
FIG. 6 is a schematic view showing the bottom end of an upright member.
Figure 7:
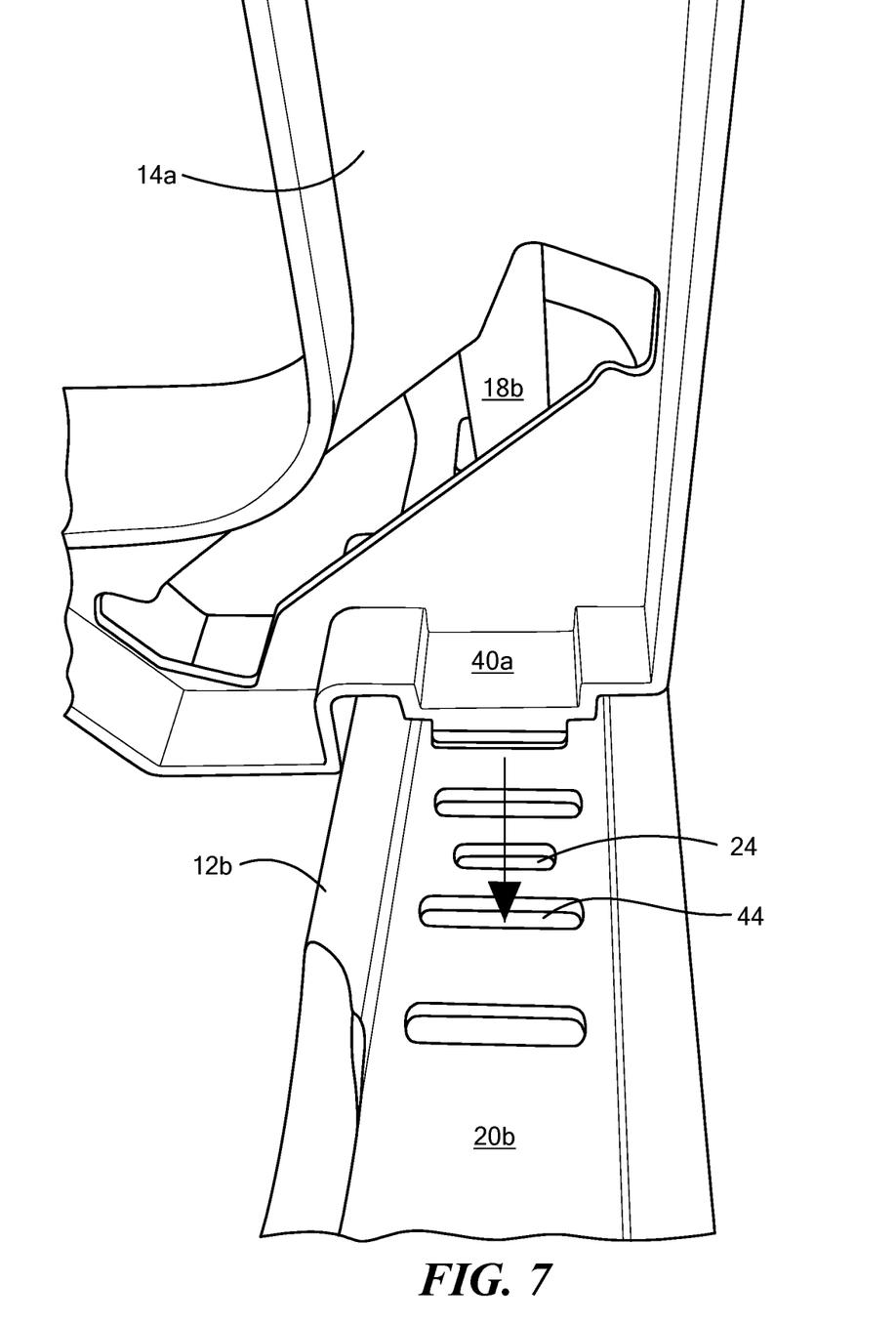
FIG. 7 is a schematic view showing the bottom end of an upright member being inserted into the channel and slots of a base member.

Preferably, each upright member 14 bottom includes a pair of depending sections 40a, FIG. 5 fitting into the channels 20a, 20b in the two base members. In this way, by choosing which slot 24 is used in each base member for each angled support member, the size of space 16 between the upright members can be varied to accommodate different size bicycle tires. Each upright member bottom depending section 40a includes opposing tabs 42a, 42b, FIG. 6-7 received in the longer slots 44, FIGS. 3-5 in the channel 20b of each base member 12b.

As shown, each upright member is in the form of a frame. All the components of the bicycle stand may be molded from high grade thermoplastic or other materials. No tools are usually necessary to assemble and/or disassemble the bicycle stand. Costs are lower because each base member is the same configuration as are both upright members and all four support members.

Figure 2:
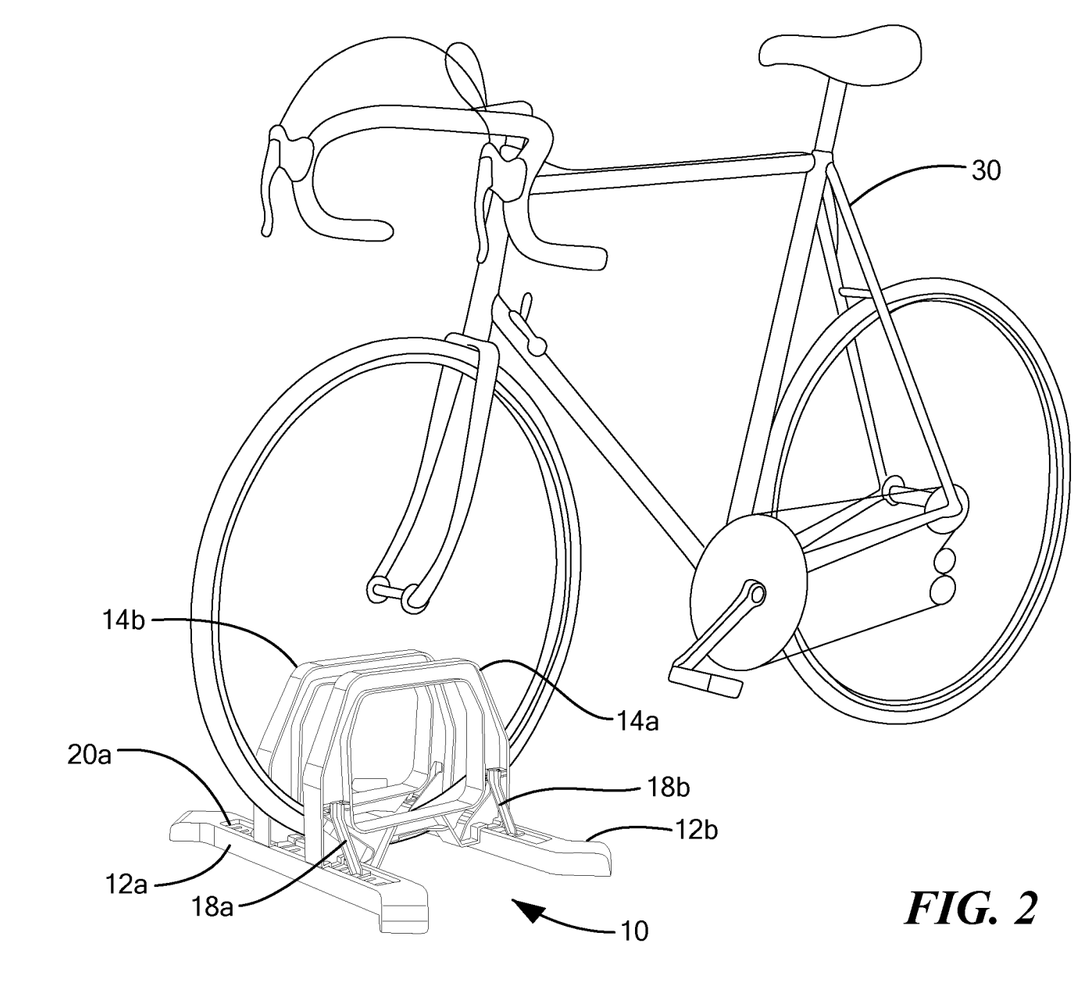
FIG. 2 is a schematic three dimensional view of the bicycle stand of FIG. 1 supporting a bicycle.
Figure 13:
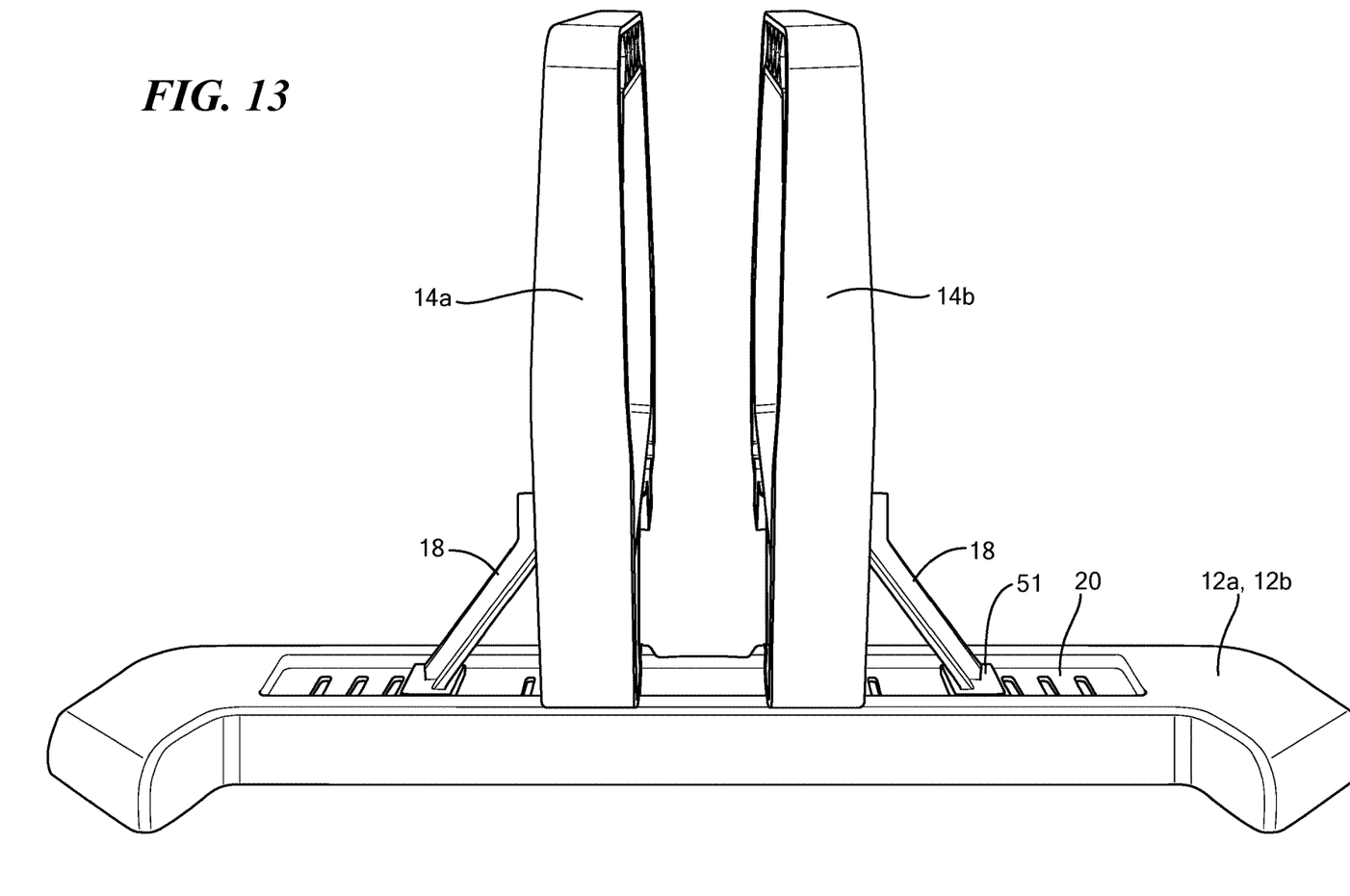
FIG. 13 is a schematic view showing the upright members and support members adjusted relative to the base members for a narrow spacing between the upright members.
Figure 14:
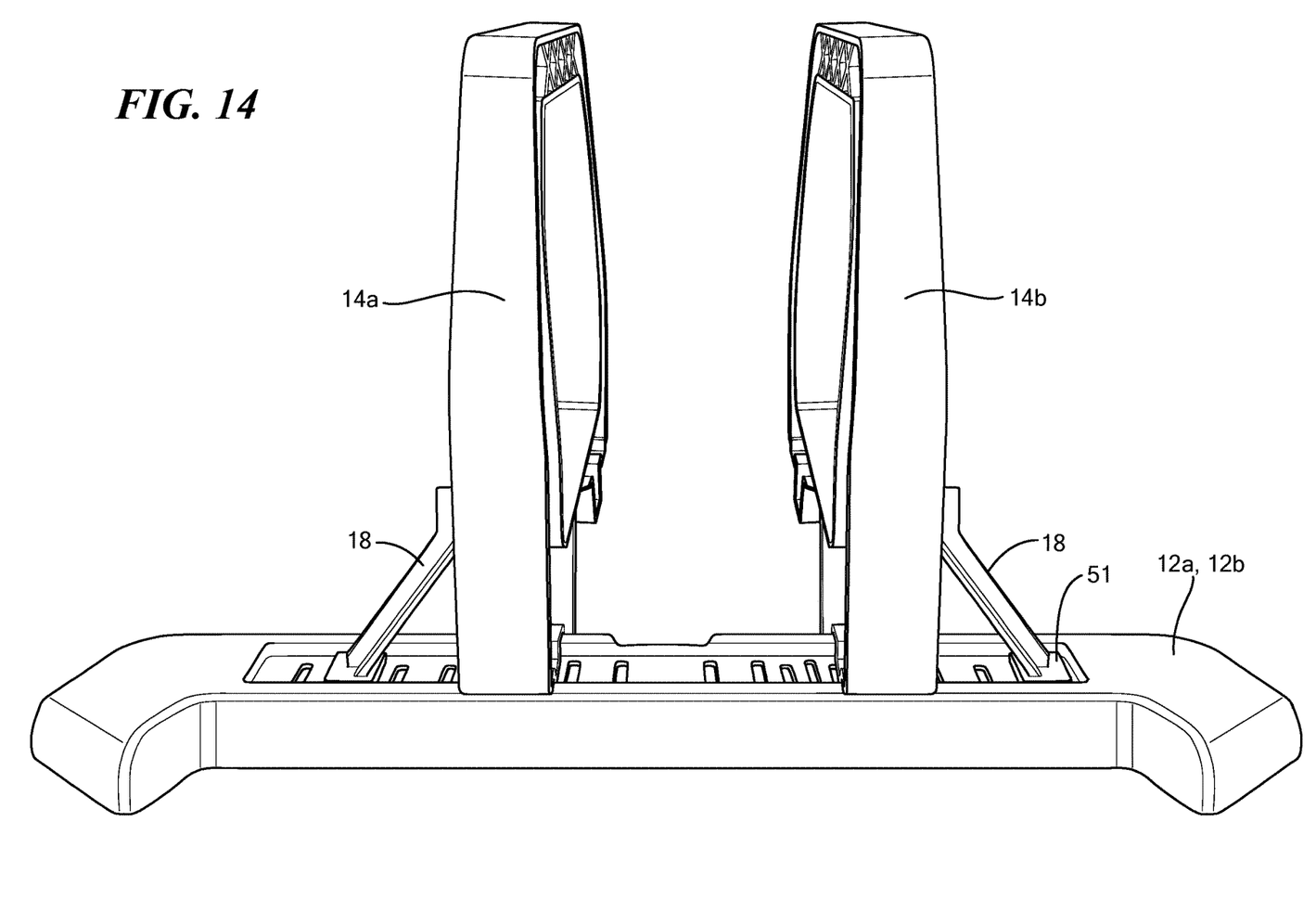
FIG. 14 is a schematic view showing the upright members and support members adjusted relative to the base members for a wider spacing between the upright members.

FIG. 2 shows a bicycle supported by stand 10 where upright members 12a and 12b are spaced closely adjacent to the sides of the front tire of the bicycle. FIGS. 13-14 show the adjustability of the stand. Other means for adjusting the upright members relative to the base members are possible. Other configurations of base members, support members, and upright members are also possible.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. An adjustable bicycle stand comprising:
   a pair of forward and rearward base members;
   a pair of right and left upright members supporting a bicycle wheel therebetween, each upright member extending between both the forward and rearward base members;
   at least one of the upright members adjustable relative to the forward and rearward base members;
   a pair of support members for the adjustable upright member, a forward support member extending between the forward base member and the adjustable upright member and a rearward support member extending between the rearward base member and the adjustable upright member;
   each base member including a series of spaced slots therein and each support member is engageable into a said slot; and
   each base member including a top channel including said slots and the adjustable upright member includes at least one tab inserted into said slots.

2. The adjustable bicycle stand of claim 1 in which the forward support member includes an angled member extending between the adjustable upright member and the forward base member.

3. The adjustable bicycle stand of claim 2 in which the adjustable upright member includes a pair of spaced channels receiving an end of a said angled member therein.

4. The adjustable bicycle stand of claim 2 in which the angled member includes a depending tang received in a slot of a base member.

5. The adjustable bicycle stand of claim 1 in which each base member includes opposing angled ends.

6. The adjustable bicycle stand of claim 1 in which each upright member is in the form of a frame.

7. An adjustable bicycle stand comprising:
a pair of forward and rearward base members;
a pair of right and left upright members supporting a bicycle wheel therebetween, each upright member extending between both forward and rearward base members;
a pair of support members for one said upright member, a forward support member extending between the forward base member and said one upright member and a rearward support member extending between the rearward base member and said one upright member;
the support members and said one upright member adjustable relative to the forward and rearward base members; and
forward and rearward the base members each include a series of spaced slots therein and each support member and said one upright member is engageable into a said slot.

8. The adjustable bicycle stand of claim 7 in which the base members each include a top channel including said slots and said one upright member includes a pair of spaced depending sections inserted into said channels and tabs inserted into said slots.

9. The adjustable bicycle stand of claim 8 in which the forward support member includes an angled member extending between the upright member and the forward base member.

10. The adjustable bicycle stand of claim 7 in which each upright member includes a pair of spaced channels receiving an end of a said support member therein.

11. The adjustable bicycle stand of claim 7 in which the forward support member includes a depending tang received in one of said spaced slots of the forward base member.

12. The adjustable bicycle stand of claim 7 in which each base member includes opposing outwardly angled ends.

13. An adjustable bicycle stand comprising:
a forward base member including a first series of slots;
a rearward base member including a second series of slots;
a first upright member supporting a bicycle wheel and extending between the forward base member and the rearward base member;
a second, adjustable upright member supporting a bicycle wheel and extending between the forward base member and the rearward base member;
a first angled, adjustable support member extending between the second, adjustable upright member and the forward base member; the first angled, adjustable support member including a first depending tang received in a slot of the first series of slots of the forward base member and the second angled, adjustable support member including a second depending tang received in a slot of the second series of slots of the rearward base member;
a second angled, adjustable support member extending between the second, adjustable upright member and the rearward base member and the second, adjustable upright member includes a first tab received in a slot of the first series of slots of the forward base member.

14. The bicycle stand of claim 13 in which the second, adjustable upright member includes a second tab received in a slot of the second series of slots of the rearward base member.

15. The bicycle stand of claim 13 in which the first, adjustable upright member includes a first channel receiving the first angled, adjustable support member therein.

16. The bicycle stand of claim 13 in which the first, adjustable upright member includes a second channel receiving the second angled, adjustable support member therein.

17. An adjustable bicycle stand comprising:
a forward base member including a first series of slots;
a rearward base member including a second series of slots;
a first adjustable upright member supporting a bicycle wheel and extending between the forward base member and the rearward base member and including a first tab received in slot of the first series of slots of the forward base member and a second tab received in a slot of the second series of slots of the rearward base member; and
a second upright member supporting a bicycle wheel and extending between the forward base member and the rearward base member;
a first angled, adjustable support member extending between the first, adjustable upright member and the forward base member; and
a second angled, adjustable support member extending between the first, adjustable upright member and the rearward base member.

18. The bicycle stand of claim 17 in which the first, adjustable upright member includes a first channel receiving the first angled, adjustable support member therein.

19. The bicycle stand of claim 18 in which the first, adjustable upright member includes a second channel receiving the second angled, adjustable support member therein.

\* \* \* \* \*